Dec. 17, 1935.  W. B. MILLER  2,024,991

COATED WELDING ROD

Original Filed Dec. 30, 1933

COATING CONTAINING COAL HAVING 20% TO 48% VOLATILE COMBUSTIBLE MATTER.

CORE, PREFERABLY FERROUS.

INVENTOR
WILBER B. MILLER.
BY
ATTORNEY

Patented Dec. 17, 1935

2,024,991

UNITED STATES PATENT OFFICE 2,024,991

COATED WELDING ROD

Wilber B. Miller, Niagara Falls, N. Y., assignor to Oxweld Acetylene Company, a corporation of West Virginia Application December 30, 1933, Serial No. 704,729
Renewed April 12, 1935

11 Claims. (Cl. 219—8)

This invention relates to coated welding rods. While it is especially adapted for use as an electrode in arc welding it is not so limited and it may be used in other types of welding.

Figure 1:
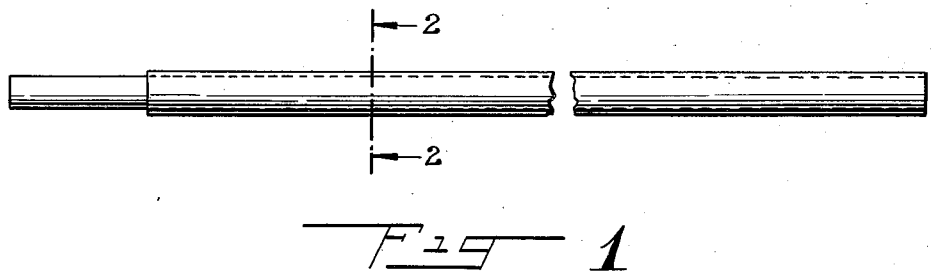
Figure 2:
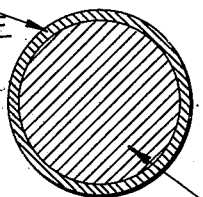

An object of my invention is to produce an electrode which will give a sound and reliable weld, which shall be capable of use without undue difficulty, which shall be simple and inexpensive of manufacture, and which shall be especially adapted for use in arc welding with heavy currents. The above and other objects of my invention will be evident from the accompanying specification having reference to the annexed drawing in which Figure 1 is a front view of a welding rod illustrating one embodiment of my invention, and Figure 2 is a cross section of the welding rod, taken on line 2—2 of Figure 1.

It is well known that it is desirable that arc welding electrodes be provided with coatings containing materials which will decompose at high temperatures, thus producing a gas protecting envelope around the arc protecting the fused and molten metal from contamination by the oxygen and nitrogen of the air. The coating also usually contains fluxing and slagging materials which afford a slag coating over the solidified and solidifying metal, protecting it from the atmosphere. When the weld is moderately cold the porous slags are easily removed from the deposited weld metal.

I have found that the use of bituminous coals in an arc welding electrode coating affords a gaseous envelope around the arc and also produces a certain amount of fixed carbon which can reduce metallic oxides at elevated temperatures. I prefer to use from 2% to 25% by weight of coal in the electrode coating. This percentage is calculated exclusive of the binder. Various types of coal may be employed. The coals which are suitable come in the classes known as sub-bituminous and bituminous. The following classifications have been found useful:

1. Sub-cannel coal.
    (a) Brown sub-cannel of brown coal or lignite rank.
    (b) Black sub-cannel coal of sub-bituminous rank.
2. Cannel coal—bituminous rank.
    (a) Boghead cannel (fuel ratio less than 0.5).
    (b) Typical cannel (fuel ratio between 0.5 and 1.0).
    (c) Lean cannel or semi-cannel (fuel ratio more than 1.0).
3. Canneloid, semi-bituminous coal with fuel ratio not exceeding 4.0.

These classifications are in accordance with those proposed by professional paper No. 100A of the United States Geological Survey "The Coal Fields of the United States" by M. R. Campbell and J. A. Bownocker. The fuel ratio is the quotient obtained by dividing the fixed carbon content by the volatile matter content as determined by proximate analysis. The cannel coals are characterized by high hydrogen content, and partly for this reason are efficacious in electrode coatings. Lignite is also characterized by high hydrogen content and is useful since it contains usually more than 50% volatile matter with a fuel ratio of approximately 1.0. I have found that dried peat has a high volatile content and may be used, but it is not as satisfactory as lignite or cannel coal on account of the necessity of removing the large amount of water which it normally contains.

Welding rods are constructed in accordance with my invention as follows: A mixture is formed of powdered coal of the desired fuel ratio and slag-forming or flux material. The coal should amount to from 2 to 25% of the mixture. A binder is added to the mixture and the coal, and the welding rod is coated with the flux mixture. I have found that water glass is especially suitable for a binder although my invention is not limited to the use of any particular binder.

Typical examples of weld rods constructed in accordance with my invention are given below:

Example I

| Flux mixture | Parts by weight |
| --- | --- |
| Calcium carbonate | 50 |
| Silica flour | 40 |
| Rutile | 10 |
| Coal (20% volatile combustible matter) | 10 |

Diluted water glass was used as a binder and the finished electrode contained about 10% coating. The core was mild steel. Similar electrodes were made for the purpose of comparison without the addition of coal. Welds were made and tested. The weld made from the electrode containing coal had a strength of about 60,000 lbs. per sq. in. and a free bend elongation of 18% to 24%. Welds from the electrode without the coal addition gave a strength of around 55,000 lbs. per sq. in. and a free bend ductility of about 12%.

Example II

| Flux mixture | Parts by weight |
| --- | --- |
| Slip clay | 50 |
| Iron oxide | 20 |
| Calcium carbonate | 20 |
| Feldspar | 20 |
| Rutile | 10 |
| Cannel coal (48% volatile combustible matter) | 10 |
| Manganese ore | 5 |
| Ferromanganese (low carbon, low silicon) | 10 |

Diluted water glass was used as a binder and the finished electrode contained about 20% coating.

The use of the cannel coal with the higher volatile combustible matter gave good arc protection and yielded less fixed carbon than a lower volatile coal. The resulting weld had a tensile strength of over 60,000 lbs. per sq. in. with a free bend elongation of 32% to 38% in the metal deposited.

While the invention has been described as applied to the coating of welding electrodes of ferrous material, it is not so limited since it is adapted for use as weld rods under other conditions.

I claim:

1. A welding rod comprising a core having a coating thereon, said coating consisting of a slag-forming material 65% to 98%, about 2% to 25% of a coal having a fuel ratio not exceeding 4.0, and a binder.

2. A welding rod consisting of a core having a coating thereon, said coating comprising slag-forming materials 75% to 98%, cannel coal 2% to 25%, and a binder.

3. A welding rod consisting of a core having a coating thereon, said coating consisting of slag-forming materials 75% to 98%, about 2% to 25% of a coal having a fuel ratio between 0.5 and 1.0, and a binder.

4. A coating mixture for ferrous welding electrodes containing about 2% to 25% of a coal having a fuel ratio not exceeding 4.0, flux materials 75% to 98%, and a binder.

5. A ferrous welding electrode having a coating thereon, said coating consisting of about 2% to 25% of coal having a fuel ratio not exceeding 4.0, calcium carbonate, silica flour and rutile together 75% to 98%, and a binder.

6. A welding electrode comprising a ferrous core and a coating on said core, said coating comprising cannel coal 2% to 25%, flux material including metallic oxides and silicious materials 75% to 98%, and a binder.

7. A welding electrode comprising a ferrous core and a coating on said core; said coating having the following approximate composition: calcium carbonate 50 parts by weight, silica flour 40 parts by weight, rutile 10 parts by weight and coal containing 20% volatile combustible matter 10 parts by weight.

8. A welding electrode comprising a ferrous core and a coating on said core, said coating having the following approximate composition by weight: slip clay 50 parts, iron oxide 20 parts, calcium carbonate 20 parts, feldspar 20 parts, rutile 10 parts, cannel coal 10 parts, manganese ore 5 parts, ferromanganese 10 parts.

9. A welding rod comprising a core having a coating thereon, said coating containing from 2% to 25% of a coal having a fuel ratio between 0.5 and 4.0.

10. A welding electrode comprising a ferrous core and a coating on said core, said coating containing from 2% to 25% by weight of high volatile coal with the balance binder and flux material including compounds of metals and silica.

11. A welding rod consisting of a core having a coating thereon, said coating containing coal, having a fuel ratio not exceeding 4.0, from 2 to 25% by weight; a binder and slag-forming materials consisting of metallic oxides and silicious materials.

WILBER B. MILLER.